Feb. 11, 1941.  A. LICHTE  2,231,341

GAS SEPARATOR

Filed April 1, 1939

Inventor:
August Lichte,

Attorneys

Patented Feb. 11, 1941

2,231,341

UNITED STATES PATENT OFFICE 2,231,341

GAS SEPARATOR

August Lichte, Dessau-Alten, Germany, assignor to Junkers Flugzeug-und Motorenwerke, Aktiengesellschaft, a corporation of Germany Application April 1, 1939, Serial No. 265,596
In Germany April 4, 1938

6 Claims. (Cl. 183—2.5)

This invention is directed to the separating of gas such as air from fuel being passed from a supply tank to an internal combustion engine. The invention is especially adapted for aircraft wherein fuel must be fed to the engine at angles of flight deviating from the horizontal.

An object of the invention is to construct a gas separator of small and compact size which efficiently and reliably separates air or other gas from liquid fuel.

Another object of the invention is to construct an air and fuel separator in which the path of flow of the fuel is such as to allow efficient separation of air from the fuel.

A further object of the invention is to construct an air and fuel separator which, without the use of moving parts, is efficient in normal position and in all angles up to and including 90° to the normal position.

A further object of the invention is to baffle the flow of liquid fuel through a small compact separator so that the float of a float operated valve is not affected by the movement of the liquid through the separator.

A further object of the invention is to construct an air and fuel separator in which baffles form pockets to facilitate the release of air from the fuel.

Generally these objects of the invention are obtained by constructing the separator as a small vessel enclosing a chamber which includes fuel inlet and outlet openings and a float operated air exhaust valve. Baffles are provided adjacent the inlet and outlet openings to form pockets. The path between the openings of these pockets into the interior of the chamber is intersected by a baffle which causes fuel to take a slow tortuous movement with abrupt turns between the fuel inlet and fuel outlet. The velocity of flow of fuel is materially reduced from the velocity through the fuel inlet. The tortuous path forces the fuel to remain in the small chamber long enough for air to separate therefrom, such separation being aided by the abrupt turns about the baffles. The float of the air exhaust valve is protected from the movement of the liquid fuel by being placed behind the baffle adjacent the fuel inlet opening. The pocket formed by the baffle adjacent the fuel outlet opening is of a size sufficient to store the amount of fuel necessary to operate the engine during the time the aircraft is in a vertical climb or dive, or at any angle within and including 90° of the horizontal.

These and other objects of my invention may be more readily understood by reference to the accompanying drawing, in which.

Figure 1:
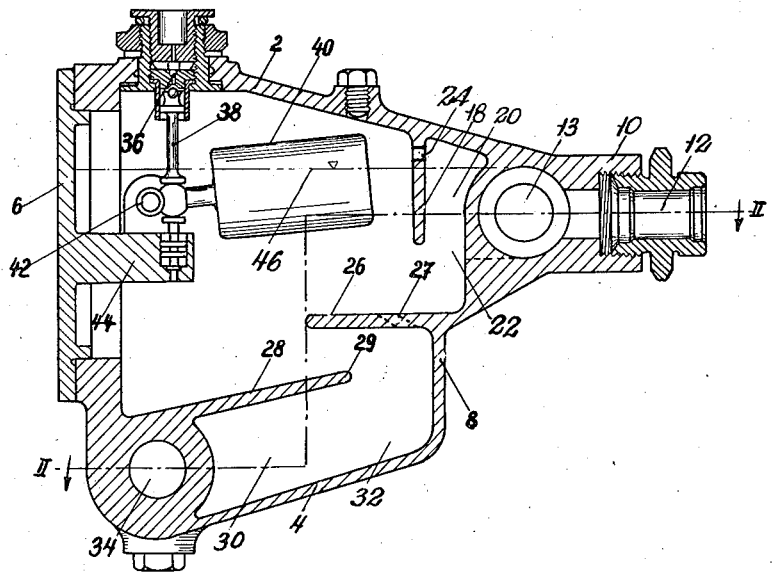
Fig. 1 is a cross sectional view of the separator taken along line I—I of Fig. 2.
Figure 2:
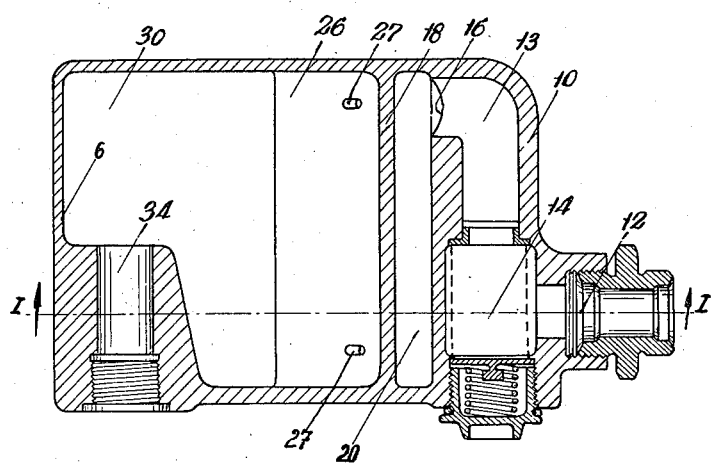
Fig. 2 is a cross sectional view on the line II—II of Fig. 1.

The separator consists of a generally box-like vessel having side walls, a top wall 2, and a bottom wall 4, which diverge toward the end wall 6. Wall 8 opposite wall 6 has adjacent the upper edge thereof a projection 10 in which a fuel inlet opening 12 is made. Projection 10 contains a bore 13 extending transversely of the vessel, in which bore a fuel filter 14 may be placed. Bore 13 communicates with the interior of the vessel through opening 16 which is located adjacent one side wall of the vessel. A baffle or partition 18 depends from the top wall 2 and forms a pocket 20 between the baffle and the end of the vessel. Pocket 20 is a passage of greater size than the size of bore 12, and thus causes liquid fuel entering pocket 20 to decrease in velocity. Opening 16 is directed toward baffle 18 so that the fuel entering the vessel will strike against the baffle and thus, by the impact, increase the loss in velocity, and by breaking the stream, aid in the release of air from the liquid. Pocket 20 communicates with the interior of the vessel through opening 22. As the fuel passes through pocket 20, air will be released therefrom, which air can escape from the upper portion of pocket 20 through ports 24 in the upper part of baffle 18.

Baffle 26 projects inwardly from wall 8 of the vessel and is disposed at substantially right angles to baffle 18. Baffle 28 extends inwardly from wall 6 and forms with wall 4 a pocket 30. The outlet 32 of this pocket to the interior of the vessel is partitioned from the opening 22 of pocket 20 by the baffle 26. Beneath baffle 28 and extending substantially half-way into the vessel is located a bore 34 which comprises the fuel outlet from the vessel.

Ports 27 are formed in baffle 26 adjacent wall 8 to allow the escape of air collecting in pocket 30 or in the space between the end 29 of baffle 28 and wall 8. These ports are inclined toward the air exhaust valve and thus air bubbles ascend directly thereto.

Air exhaust valve 36 is located in wall 2 adjacent wall 6. By reason of the inclination of wall 2 with respect to the longitudinal axis of the vessel, an air collecting pocket is formed immediately beneath wall 2 and adjacent the location of the valve 36. Valve 36 is operated by a valve stem 38 and float 40 pivotally supported at 42 from shelf 44 which projects inwardly from wall 6.

Fuel normally fills the vessel to the level indicated by the dash-dot line 46. It is noted that in normal position of the separator, as in Fig. 1, the level of the fuel in the vessel is below the ports 24 in baffle 18, and at the top of bore 12. Fuel entering the inlet opening 12 passing through bore 13 and opening 16 is projected against baffle 18, thus losing part of its velocity and allowing air to escape therefrom, which air passes through port 18 and collects beneath the top wall 2. The fuel passes downwardly in pocket 20 at a reduced velocity, and passes through opening 22 into the interior of the vessel. The direction of flow of the liquid is changed abruptly by baffle 26, and this and subsequent turns in direction aid in the release of air from the fuel. Fuel must then pass between baffles 26 and 28 and enter pocket 30 through opening 32, the tortuous path between openings 22 and 32 causing the fuel to stay longer in its passage through the vessel and thus allowing a greater time for air to escape from the fuel. Escaping air, of course, rises to collect beneath top wall 2 until sufficient air collects to force the level of the fuel downwardly from the level of line 46, thus lowering the float and opening the air exhaust valve.

Baffle 28 is inclined with respect to baffle 26 and the longitudinal axis of pocket 30 makes an angle, as shown, slightly greater than a right angle with respect to the longitudinal axis of pocket 20. Baffle 28 is of such length as to make pocket 30 of sufficient size to hold enough fuel to run the engine during the time the aircraft is in a vertical dive or climb. The length of baffle 28 is also such that when the separator is turned 90° from its position shown in Fig. 1 with the wall 6 downwardly, the level of the fuel will always rise above the end 29 of baffle 28 during the time required for a normal dive of the aircraft. In such position, air will collect between the end 29 and the wall 8 of the vessel, and when the vessel is turned back to normal position as shown in Fig. 1, the air can escape through ports 27 to the exhaust valve 36. At no time during this change in position does air enter the pocket 30.

When the aircraft is standing on the ground with the tail of the aircraft lower than the engine, the axis of the vessel will be inclined between the normal and 90° positions. However, because of the length of the baffles 28 and 26, the air can separate from the fuel during passage of the fuel through the vessel, and no air enters pocket 30.

It is therefore seen that by means of this construction, a small compact and efficient air and fuel separator is created. The separator acts sufficiently while the aircraft is at rest on the ground, while the aircraft is in normal flight, and while the airplane is in a vertical dive or climb. The tortuous path taken by the fuel from the inlet to the outlet, together with the lowering of the pressure of the fuel and its decrease in velocity, provides within a small compact vessel adequate time for the air to separate from the fuel during the passage of the fuel through the vessel. The float of the exhaust valve can be placed close to the inlet opening as it is protected from fluid movement by baffle 18, thus permitting the making of a compact unit.

Having now described a means by which the objects of this invention are obtained, what I claim and desire to secure by Letters Patent of the United States is:

1. A fuel and air separator comprising a vessel having top, bottom and side walls enclosing a chamber, a baffle within said chamber extending downwardly from the top wall substantially parallel to one of the side walls and forming a pocket therewith, a fuel inlet opening into said pocket, a second baffle within said chamber extending from the opposite side wall substantially parallel to the bottom wall and forming a pocket therewith, a fuel outlet opening into said second pocket, an air escape valve in the top wall of the vessel remote from each pocket, a float connected to said valve to control the same, and a third baffle extending within the chamber from the first side wall beneath the free lower end of said first pocket-forming baffle to a line above the horizontal plane of the free end of the second pocket-forming baffle and intersecting the common plane of the free ends of the pocket-forming baffles.

2. In a device as in claim 1, said third baffle extending to a line vertically above the second pocket-forming baffle.

3. In a device as in claim 1, said first pocket-forming baffle having at least one opening therethrough adjacent the top thereof whereby air separated therein may escape into the main portion of the chamber.

4. In a device as in claim 1, said third baffle extending to a line vertically above the second pocket-forming baffle and having at least one opening therethrough, whereby air separating from the fuel in said second pocket may escape into the main portion of the chamber.

5. In a device as in claim 1, said side and bottom walls forming an angle therebetween of at least 45°.

6. In a device as in claim 1, the first pocket-forming baffle extending below the lowest position of the float.

AUGUST LICHTE.